(12) United States Patent
Auckenthaler

(10) Patent No.: US 8,915,063 B2
(45) Date of Patent: Dec. 23, 2014

(54) METHOD AND DEVICE FOR ESTIMATING NOX EMISSIONS IN COMBUSTION ENGINES

(75) Inventor: Theophil Auckenthaler, St. Gallen (CH)

(73) Assignee: Iveco Motorenforschung AG, Arbon (CH)

( * ) Notice: Subject to any disclaimer, the term of this patent is extended or adjusted under 35 U.S.C. 154(b) by 158 days.

(21) Appl. No.: 13/261,335

(22) PCT Filed: Dec. 22, 2010

(86) PCT No.: PCT/EP2010/070472
§ 371 (c)(1),
(2), (4) Date: Jun. 22, 2012

(87) PCT Pub. No.: WO2011/076838
PCT Pub. Date: Jun. 30, 2011

(65) Prior Publication Data
US 2012/0285145 A1    Nov. 15, 2012

(51) Int. Cl.
*F01N 3/00*      (2006.01)
*F02D 41/14*    (2006.01)
*F02D 41/00*    (2006.01)
*F02D 41/24*    (2006.01)
*F02M 25/07*   (2006.01)

(52) U.S. Cl.
CPC ............ *F02D 41/146* (2013.01); *F02D 41/005* (2013.01); *F02D 41/1461* (2013.01); *F02D 41/1462* (2013.01); *F02D 41/2451* (2013.01); *F02M 25/0754* (2013.01); *Y02T 10/47* (2013.01); *F02D 41/1402* (2013.01); *F02M 25/0701* (2013.01); *F02M 25/0727* (2013.01)
USPC .................... 60/277; 60/276; 60/278

(58) Field of Classification Search
CPC . F02D 41/005; F02D 41/146; F02D 41/1461; F02D 41/1462; F02D 41/2451; F02D 41/1402; F02M 25/0754; F02M 25/0701; F02M 25/0727; Y02T 10/47
USPC .................................................. 60/272–324
See application file for complete search history.

(56) References Cited

U.S. PATENT DOCUMENTS

| | | | |
|---|---|---|---|
| 6,216,452 B1 * | 4/2001 | Naito et al. | 60/278 |
| 6,701,244 B2 * | 3/2004 | Oota et al. | 701/104 |
| 2005/0056265 A1 * | 3/2005 | Center | 123/681 |
| 2008/0010973 A1 * | 1/2008 | Gimbres | 60/276 |
| 2009/0158706 A1 | 6/2009 | Sun | |

FOREIGN PATENT DOCUMENTS

| | | |
|---|---|---|
| WO | WO 2005/001266 | 1/2005 |
| WO | WO 2008/131789 | 11/2008 |

OTHER PUBLICATIONS

XP-001517211, Nov. 1, 2008, Forshung.

* cited by examiner

*Primary Examiner* — Jesse Bogue
(74) *Attorney, Agent, or Firm* — Stetina Brunda Garred & Brucker

(57) ABSTRACT

The present invention provides for a system for controlling NOx emissions based on the calculation of an error given by the difference between a first measured value obtained from a NOx sensor (7) and a second one estimated from a NOx estimation. Said sensor (7) can be used in an adaptation loop, where an open-loop or closed-loop EGR control system is adapted such that the expected NOx emissions (from the EGR controller) match the ones measured with the NOx sensor under steady-state conditions.

8 Claims, 3 Drawing Sheets

METHOD AND DEVICE FOR ESTIMATING NOX EMISSIONS IN COMBUSTION ENGINES

FIELD OF THE INVENTION

The present invention relates to a method and device for estimating NOx emissions in combustion engines.

DESCRIPTION OF THE PRIOR ART

One of the most important targets of EGR is to reduce the NOx emissions.

Nowadays, most engines are equipped with an NOx aftertreatment system such as an SCR (Selective Catalytic Reduction) catalyst or a lean NOx trap. The control of the NOx conversion performance of these systems relies on estimated or measured values of the upstream NOx concentration. Therefore, an NOx sensor is often mounted at the inlet of the aftertreatment system, which corresponds to the outlet of the engine.

The NOx emissions of a combustion engine can be significantly reduced using exhaust gas recirculation (EGR). Thereby, the NOx emissions react very sensitively to variations of the EGR rate, where the EGR rate is the mass ratio between the recirculated exhaust gas and the total gas injected in the cylinders of the combustion engine. Depending on the emission target, EGR rates between 20% and 60% are aimed at, which leads to an NOx reduction factor of 3 to 10.

Since the main goal of applying EGR is to reduce the NOx, a measurement concept based on an NOx measurement device is straight-forward.

Therefore, an NOx sensor is used as a feedback signal for EGR control.

However, currently available NOx sensors exhibit large response times, typically time delays of 500-1000 ms and time constants around 500-1500 ms. Additionally, the accuracy during transient operations is often limited because of the sensor's measurement principle. Therefore, the direct use of the sensor signal in an EGR feedback loop or as an input quantity for an after-treatment system often does not give satisfactory results.

For EGR control, the poor sensor performance makes an efficient, reliable, and sufficiently fast control a very difficult if not impossible task. Even if the sensor is only used for the determination of the upstream NOx concentration of an aftertreatment system, the slow dynamics of the device may introduce severe problems for maintaining a reliable and robust NOx conversion efficiency.

SUMMARY OF THE INVENTION

Therefore it is the main object of the present invention to provide a method and device for estimating NOx emissions in combustion engines which overcomes the above problems/drawbacks.

According to the invention, the method provides for the correction of a fast but potentially inaccurate NOx emission model by means of a difference between a first measured value obtained from an NOx sensor and a second estimated value obtained from a NOx estimation.

Preferably, such an estimation is corrected by means of an adaptation filter such as an integrator, an adaptive curve or map or any similar element or procedure.

Such an error can be, advantageously, used for adjusting either the EGR rate in case of an engine which makes use of EGR, or to adjust the NOx estimation in case of an engine without EGR.

A device implementing such a method comprises a NOx sensor used in an adaptation loop, where an open-loop or closed-loop EGR control system is adapted such that the expected NOx emissions (from the EGR controller) match the ones measured with the NOx sensor under steady-state conditions. Thereby, two embodiments may be considered: firstly, if any sensor for the determination of the EGR rate is present, this measured EGR rate may be corrected; secondly, if the concept is used in an open-loop EGR controller, the commanded EGR rate or even the EGR actuator position may be adjusted.

For engines without EGR, a device implementing such a method, corrects an NOx estimation model, which is, for example, based on a combustion model, such that the steady-state NOx concentration estimated by the model matches the one obtained from the sensor.

These and further objects are achieved by means of an apparatus and method as described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein.

The same reference numerals and letters in the figures designate the same or functionally equivalent parts.

DETAILED DESCRIPTION OF THE PREFERRED EMBODIMENTS

A useful model for the estimation of NOx emissions takes into account several quantities, which have an impact on the NOx formation. These quantities may be injected fuel, engine speed, boost pressure, boost air temperature, rail pressure, start of injection angle, EGR rate, or others, which have an influence on the flame temperature and on the combustion.

According to the figures enclosed, the blocks 5, 5' and 5" are input blocks in the respective schemes accounting for said quantities/parameters, such as injected fuel, engine speed, etc.

If an EGR measurement device or any sensor concept to calculate the EGR, in terms of rate or mass flow, is present, this obtained value is accounted for in the NOx estimation. In case of no EGR measurement, the EGR set point or any calculated EGR rate is considered in the NOx estimation.

Figure 1:
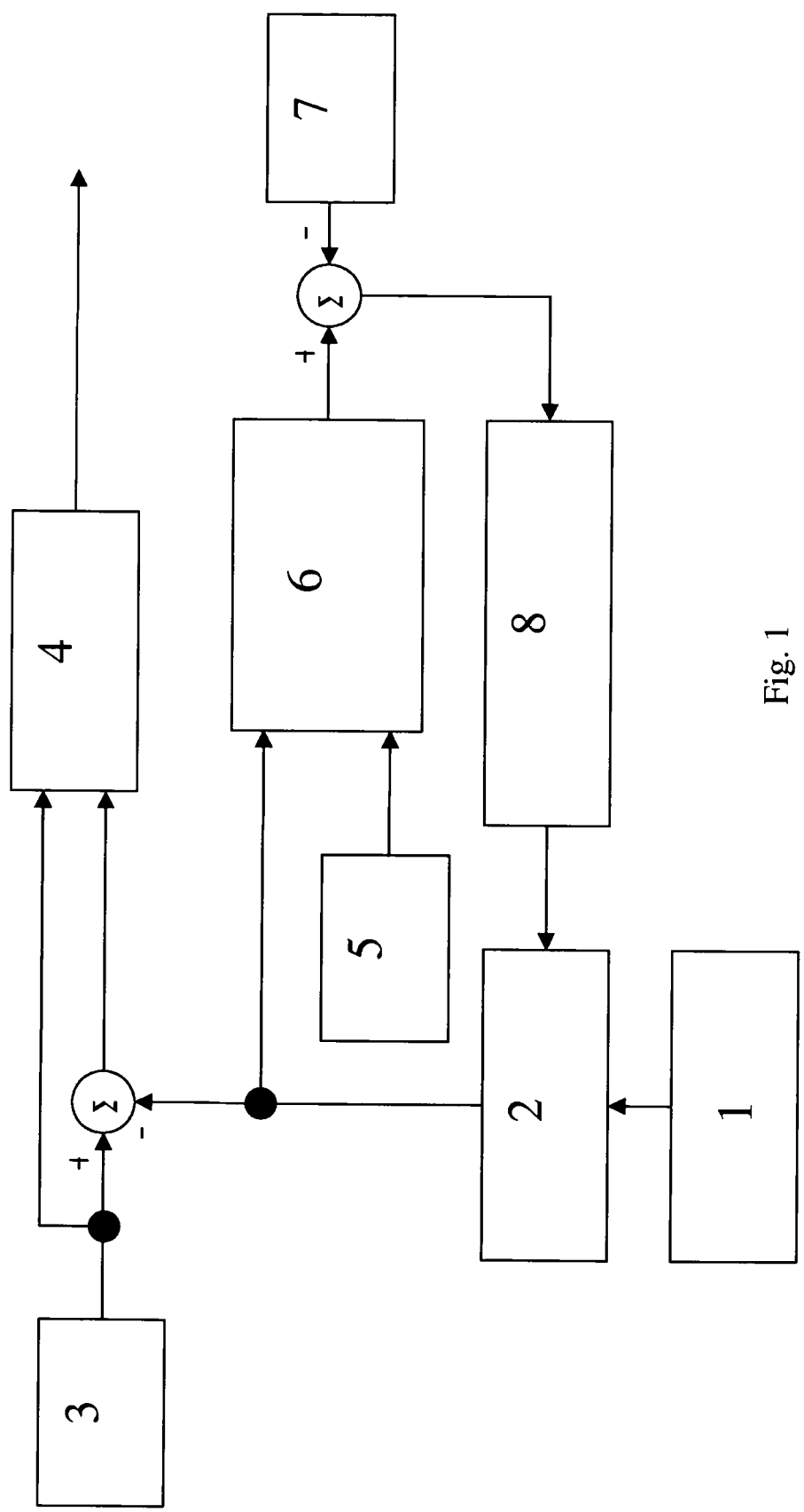
FIG. 1 shows a control scheme in accordance with the invention for closed loop EGR control set-up with an EGR measurement device.

FIG. 1 shows a sketch of the adaptive concept if an EGR closed loop control concept with an EGR measurement is present.

The block 3 represents an EGR set point used both as an input of a first sum node and as a Feed Forward path for the block 4, which represents an EGR control. In said first sum node it is subtracted the output of a block 2 representing a EGR measurement correction block, of an EGR measurement coming from block 1. The output of said first sum node is one other input for said EGR control block 4.

Said block 2 works on the output of an adaptation block 8, such as an integrator, an adaptive curve or map or any similar element or procedure.

The input of such an adaptation block 8 is the difference between a first measured value obtained from an NOx sensor 7 and a second estimated value obtained from a NOx estimator block 6, which has as input said engine quantities/parameters represented by means of the block 5 and of the output of said EGR measurement correction block 2.

The estimator 6 can be implemented in a known way, for example according to the disclosure by Alexander Schilling: "Model-Based Detection and Isolation of Faults in the Air and Fuel Paths of Common-rail DI Diesel Engines Equipped with a Lambda and a Nitrogen Oxides Sensor", PhD thesis, Diss. ETH No. 17764, ETH Zürich, Switzerland, 2008.

In case of a closed-loop EGR control concept, one approach is to correct the measured EGR rate or mass flow with an adaptation method, which makes use of the difference between the measured and the estimated NOx concentration. The EGR measurement is corrected such that this difference, i.e. error, converges to zero. The adaptation method can comprise an integration, an adaptive curve or map or any similar element or procedure. The correction of the EGR can be additive (offset) or multiplicative (correction factor), or using any other algebraic operation, correction curve, or map.

Since the controller forces the measured and corrected EGR rate or mass flow to the set point, finally a value identical to the set point is fed to the NOx estimation. Hence, after controller convergence, the NOx estimation always calculates the same value if all other engine quantities are identical, therefore said error is zero. Since the adaptation method forces the estimated NOx value to the measured one, the estimated NOx represent the measured ones after convergence. Hence, the EGR controller can be seen as an NOx controller. The NOx concentration is maintained upon a disturbance of the EGR line (EGR cooler fouling, production scatter, EGR valve fouling, etc.) or the EGR measurement principle (sensor drift, etc.).

Figure 2:
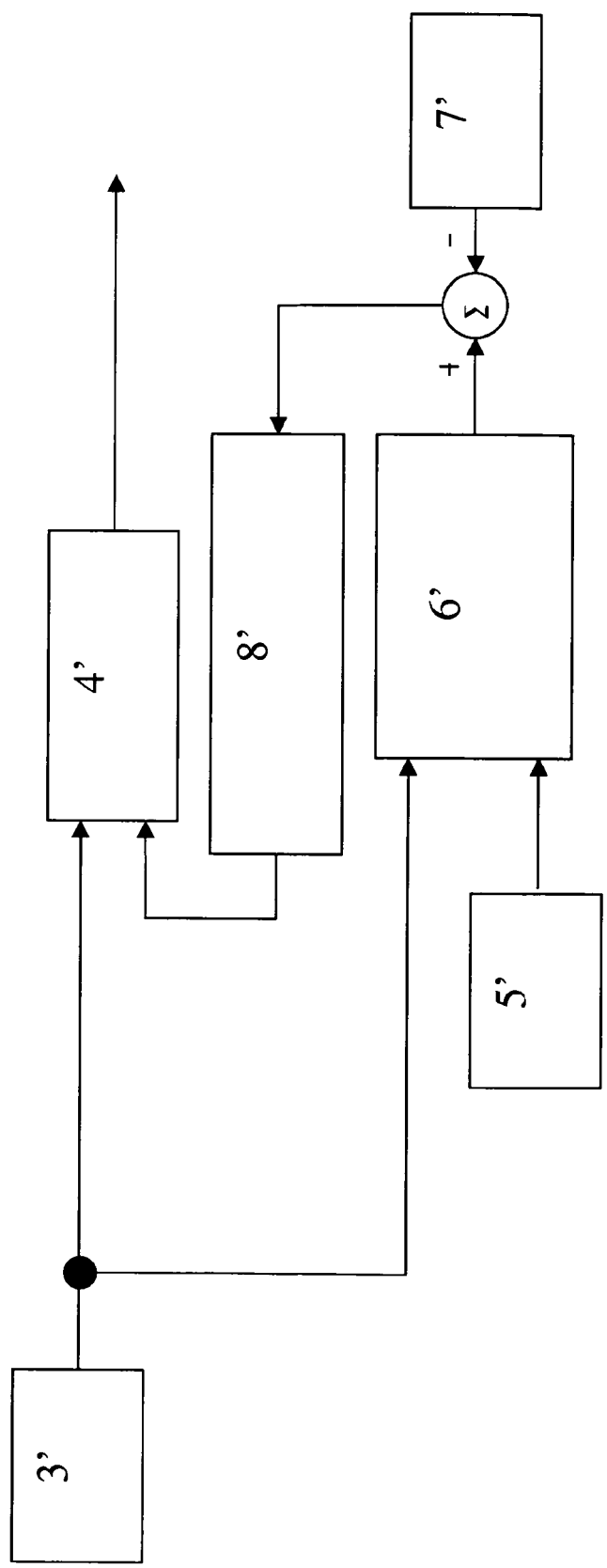
FIG. 2 shows a control scheme using an NOx sensor in case of an open-loop EGR control set-up without any EGR measurement device.

FIG. 2 shows the adaptive concept with an EGR feed-forward controller and without EGR measurement present.

According to FIG. 2, the block 3' represents an EGR set point used as one input of EGR feed-forward control block 4'. One other input of said EGR feed-forward control block 4' is the output of an adaptation block 8', such as an integration, etc. The input of such an adaptation block 8', likewise the FIG. 1, is the difference between a first measured value obtained from an NOx sensor 7' and a second estimated value obtained from a NOx estimator block 6', which has as one first input said engine quantities/parameter represented by means of the block 5' and the output of said EGR set point block 3' as one second input.

The estimator 6' can be implemented in a similar way as for the estimator 6.

In case of an open-loop EGR control concept as depicted in FIG. 2, one approach is to correct the EGR actuator position directly with an adaptation method, which makes use of the difference between the measured and the estimated NOx concentration. The EGR actuator position is corrected such that this difference, i.e. this error, converges to zero. The adaptation method can be carried out by means of an integrator, an adaptive curve or map or any similar element or procedure. The correction of the EGR actuator position can be additive (offset) or multiplicative (correction factor), or using any other algebraic operation, correction curve, or map.

The EGR set point is fed to the NOx estimation. Hence, the NOx estimation always calculates the same value, if all other engine parameters are identical. Since the adaptation method forces the estimated NOx value to the measured one, the estimated NOx represent the measured ones after convergence. Hence, the EGR controller can be seen as an NOx controller. The NOx concentration is maintained upon a disturbance or drift effects of the EGR line (EGR cooler fouling, production scatter, EGR valve fouling, etc.).

Figure 3:
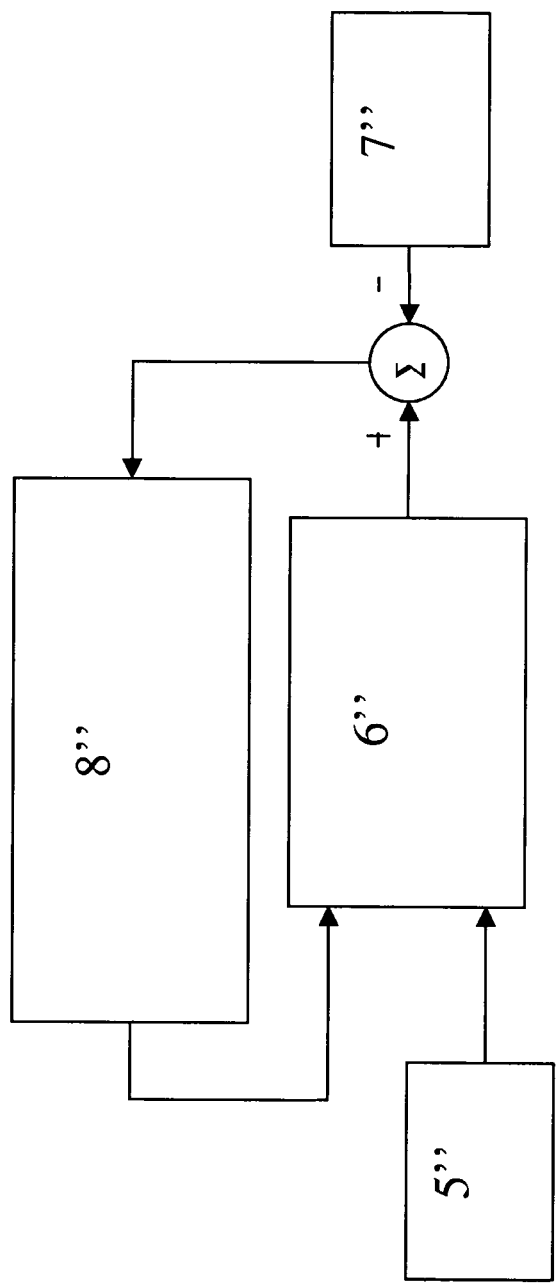
FIG. 3 shows a control scheme for engines without EGR.

FIG. 3 shows a sketch of an adaptation method for engines, where no EGR is present. Here, simply the estimated NOx are adapted such that they match the measured ones under steady state conditions. This ensures steady state accuracy of the measurement device and fast transient response of the NOx estimation. The adaptation can be implemented using a simple integrator (slow I-controller), an adaptive curve or map, or any similar adaptive concept.

According to FIG. 3, a NOx estimator represented by the block 6'' receives as input both said engine parameters/quantities represented by the block 5'' and the output of a NOx adaptation 8'', that is an integrator, etc. And the input of said NOx adaptation 8'' is, likewise the FIGS. 1 and 2, the difference between a first measured value obtained from an NOx sensor 7'' and a second estimated value obtained from said NOx estimator block 6''.

The estimator 6'' can be implemented in a similar way as for the estimator 6.

Advantageously, the EGR measurement refers to the measurement of the EGR rate or the EGR mass flow, but the same method can be applied for any NOx influencing setup, like the air measurement and control by using an EGR controller or e.g. fuel injection, such as rail pressure, start of injection angle, pilot injection, etc. Moreover, instead of the EGR measurement, also the EGR set point can be corrected.

This invention can be implemented advantageously in a computer program comprising program code means for performing one or more steps of such method, when such program is run on a computer. For this reason the patent shall also cover such computer program and the computer-readable medium that comprises a recorded message, such computer-readable medium comprising the program code means for performing one or more steps of such method, when such program is run on a computer.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Further implementation details will not be described, as the man skilled in the art is able to carry out the invention starting from the teaching of the above description.

The invention claimed is:

1. Method for controlling an EGR system in a combustion engine of a vehicle, comprising NOx sensing means and EGR sensing means, the method comprising:
    calculating a controlling NOx error value given by a difference between a first measured value obtained from the NOx sensing means and a second estimated NOx value;
    measuring of EGR rate or mass flow;
    correcting the measurement of the EGR rate or mass flow with an adaptation method, the adaptation method utilizing the difference between the first measured value and the second estimated value of NOx concentration as an input so as to force a second estimated NOx value to the first measured NOx value;
    controlling the EGR rate or mass flow by a closed-loop procedure based on the corrected EGR measurement and a reference value;

estimating NOx value on engine quantities/parameters and on the corrected EGR measurement.

2. Method according to claim 1, wherein the adaptation method is an integration, an adaptive curve, a map or combinations thereof.

3. Device for controlling an EGR system in a combustion engine, comprising;
NOx sensing means;
EGR sensing means for measuring of EGR rate or mass flow;
means for correcting said EGR measurement with an output of an adaptation filter to force a second estimated NOx value to a first measured NOx value wherein an input of the adaptation filter is the difference between the first measured value and the second estimated NOx value;
means for estimating NOx value on engine quantities/parameters and on said corrected EGR measurement;
means for calculating the difference between the first measured value obtained from the NOx sensing means and the second estimated NOx value.

4. The device of claim 3 wherein wherein the adaptation filter is an integration, an adaptive curve, a map or combinations thereof.

5. Method for controlling an EGR system in a combustion engine of a vehicle, comprising NOx sensor and EGR sensor, the method comprising:
calculating a NOx error value given by a difference between a first measured value obtained from the NOx sensor and a second estimated NOx value;
measuring of EGR rate or mass flow;
correcting the measurement of the EGR rate or mass flow with an adaptation method, the adaptation method utilizing the difference between the first measured value and the second estimated value of NOx concentration as an input so as to force the first measured NOx value to the second estimated NOx value;
controlling the EGR rate or mass flow by a closed-loop procedure based on the corrected EGR measurement and a reference value;
estimating NOx value on engine quantities/parameters and on the corrected EGR measurement.

6. Method according to claim 5, wherein the adaptation method is an integration, an adaptive curve, a map or combinations thereof.

7. Device for controlling an EGR system in a combustion engine, comprising;
NOx sensor;
EGR sensor for measuring of EGR rate or mass flow;
a correcting circuit for correcting said EGR measurement with an output of an adaptation filter to force a second estimated NOx value to a first measured NOx value wherein an input of the adaptation filter is the difference between the first measured value and the second estimated NOx value;
an estimating circuit for estimating NOx value on engine quantities/parameters and on said corrected EGR measurement;
a calculating circuit for calculating the difference between the first measured value obtained from the NOx sensor and the second estimated NOx value.

8. The device of claim 7 wherein the adaptation filter is an integration, an adaptive curve, a map or combinations thereof.

* * * * *